United States Patent
Miura et al.

(10) Patent No.: US 9,569,382 B2
(45) Date of Patent: Feb. 14, 2017

(54) INHIBITION DEVICE, METHOD FOR CONTROLLING INHIBITION DEVICE, DEVICE UNDER CONTROL, ELECTRONIC EQUIPMENT, AND COMPUTER READABLE STORAGE MEDIUM

(71) Applicant: SHARP KABUSHIKI KAISHA, Osaka-shi, Osaka (JP)

(72) Inventors: Takashi Miura, Osaka (JP); Kenichi Horiuchi, Osaka (JP); Seigo Itoh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 408 days.

(21) Appl. No.: 14/357,892

(22) PCT Filed: Jan. 11, 2013

(86) PCT No.: PCT/JP2013/050480
§ 371 (c)(1),
(2) Date: May 13, 2014

(87) PCT Pub. No.: WO2013/114935
PCT Pub. Date: Aug. 8, 2013

(65) Prior Publication Data
US 2014/0317326 A1    Oct. 23, 2014

(30) Foreign Application Priority Data
Feb. 2, 2012   (JP) .................................. 2012-021247

(51) Int. Cl.
*G06F 1/32*      (2006.01)
*G06F 13/24*     (2006.01)
*H04W 52/02*     (2009.01)

(52) U.S. Cl.
CPC ............ *G06F 13/24* (2013.01); *G06F 1/3206* (2013.01); *G06F 1/3234* (2013.01);
(Continued)

(58) Field of Classification Search
CPC ...... G06F 1/324; G06F 1/3287; G06F 1/3203; G06F 3/0488
See application file for complete search history.

(56) References Cited

U.S. PATENT DOCUMENTS 6,389,447 B1 *   5/2002   Singh .................... G06F 9/4881
                                                            718/100
6,834,354 B1 *  12/2004   Togawa ................ G06F 1/3203
                                                            713/320
(Continued)

FOREIGN PATENT DOCUMENTS

JP    2000-222075 A    8/2000
JP    2002-304232 A   10/2002
(Continued)

OTHER PUBLICATIONS

H. Shivaprashanth et al. "Design and Implementation of Low Power Techniques for Android Based Phone", SASTECH Journal vol. 9, Issue 2, Sep. 2, 2010, pp. 71-78.

*Primary Examiner* — Brian Misiura
(74) *Attorney, Agent, or Firm* — Birch, Stewart, Kolasch & Birch, LLP (57) ABSTRACT

An inhibition device includes: a location information obtaining section that obtains, from a computing device, information on a touch location; a operation determining section that determines, in accordance with the information on the touch location, whether or not an operation of a user is an operation for causing the computing device to execute a predetermined process; and an inhibition information transmitting section that transmits inhibition information.

17 Claims, 5 Drawing Sheets

(52) U.S. Cl.
CPC ......... *H04W 52/0254* (2013.01); *G06F 1/324* (2013.01); *G06F 1/3296* (2013.01); *Y02B 60/1217* (2013.01); *Y02B 60/50* (2013.01)

(56) References Cited

U.S. PATENT DOCUMENTS

| | | | | |
|---|---|---|---|---|
| 8,504,935 | B2* | 8/2013 | Stallings | G06F 3/04817 715/778 |
| 8,538,484 | B2* | 9/2013 | Chan | G06F 1/28 455/566 |
| 8,644,846 | B2* | 2/2014 | Kim | H04M 1/72544 455/456.1 |
| 8,812,029 | B1* | 8/2014 | Cao | H04M 1/72522 455/456.1 |
| 8,949,639 | B2* | 2/2015 | Kamhi | G06F 1/3287 713/300 |
| 8,972,760 | B1* | 3/2015 | Zajac | G06F 1/3212 455/574 |
| 9,026,814 | B2* | 5/2015 | Aasheim | G06F 1/3206 713/310 |
| 9,075,514 | B1* | 7/2015 | Karakotsios | G06F 3/04842 |
| 9,119,314 | B2* | 8/2015 | Koppal | H05K 1/147 |
| 9,175,967 | B2* | 11/2015 | Abramson | G01C 21/3697 |
| 9,210,659 | B2* | 12/2015 | Kim | H04W 52/0225 |
| 9,229,522 | B1* | 1/2016 | Tian | G06F 1/3265 |
| 9,311,112 | B2* | 4/2016 | Shaffer | G06F 3/04883 |
| 9,351,254 | B2* | 5/2016 | Backholm | H04W 52/0251 |
| 9,363,772 | B2* | 6/2016 | Burks | H04W 52/383 |
| 9,411,430 | B2* | 8/2016 | Holmgren | G06F 3/0421 |
| 2010/0037080 | A1 | 2/2010 | Kawashima et al. | |
| 2010/0332876 | A1 | 12/2010 | Fields, Jr. et al. | |
| 2011/0040989 | A1* | 2/2011 | Keyes | G06F 1/1626 713/300 |
| 2012/0297215 | A1* | 11/2012 | Saba | G06F 1/3203 713/320 |
| 2013/0268257 | A1* | 10/2013 | Hu | G06F 17/5009 703/22 |
| 2014/0317326 | A1* | 10/2014 | Miura | H04W 52/0254 710/260 |
| 2015/0056974 | A1* | 2/2015 | Kim | H04M 1/72563 455/418 |
| 2015/0109257 | A1* | 4/2015 | Jalali | G06F 3/0488 345/175 |
| 2015/0234446 | A1* | 8/2015 | Nathan | G06F 1/3262 345/174 |

FOREIGN PATENT DOCUMENTS

| | | |
|---|---|---|
| JP | 2006-235907 A | 9/2006 |
| JP | 2006-251982 A | 9/2006 |
| JP | 2007-108855 A | 4/2007 |
| JP | 4123640 B2 | 7/2008 |
| JP | 2010-39791 A | 2/2010 |
| JP | 2010-166607 A | 7/2010 |

\* cited by examiner

INHIBITION DEVICE, METHOD FOR CONTROLLING INHIBITION DEVICE, DEVICE UNDER CONTROL, ELECTRONIC EQUIPMENT, AND COMPUTER READABLE STORAGE MEDIUM

TECHNICAL FIELD

The present invention relates to an inhibition device that inhibits a transition of a status of a controlled device (device under control).

BACKGROUND ART

Electric power control by use of electronic devices is becoming increasingly important due to an increase in electric power consumption of CPUs (Central Processing Unit) as a result of performance advancements. Conventionally, electronic devices are equipped with such a function as power-saving mode called "suspension" or "hibernation" in order to reduce electric power consumption while users are not using the electronic devices.

The power-saving mode function works so that, before a user turns off a power supply of an electronic device, the electronic device transfers, to a non-volatile storage device (hard disk), information which is stored in a volatile storage device (memory). Then, the electronic device transfers the information back to the volatile storage device when the user turns the power supply back on. This allows the user to resume his/her operation in a state identical to that immediately before the power supply was turned off. Although this function is widely implemented in various electronic devices, the function is only available while a user is not using an electronic device at all. This is because operations of all of components included in the electronic device become suspended while the above function is taking effect.

Meanwhile, timings, with which a computation load is applied to a CPU, are limited. Therefore, such a method is possible in which, even while a user is using an electronic device, electric power consumption is dynamically reduced by suspending, with predetermined timings, part of components included in the electronic device (it is generally called "degenerate operation" when an electronic device is operating while part of components is suspended). Alternatively, another method is possible in which all the devices are made to operate by intensively supplying electric power only when a computation load is applied, and electric power consumption is therefore efficiently distributed.

For example, Patent Literature 1 discloses an image capturing device that simultaneously achieves an improvement in start-up performance and a reduction in electric power consumption. In a case where an image is to be captured with the use of a camera, the image capturing device enhances image capturing performance by temporarily increasing a clock frequency of a CPU. Patent Literature 2 discloses a device that controls an operating frequency of a CPU in accordance with a process to be executed. In a case where the device receives user input, the device sets a clock frequency of the CPU to a predetermined rate.

Patent Literature 3 discloses an information processing system that includes a processor whose operating speed is changeable. The information processing system is designed to reduce electric power consumption by reducing, within tolerance of a response time, an operating frequency of the processor. Patent Literature 4 discloses an information processing device that eliminates delay time of low priority tasks. The information processing device enhances processing stability by eliminating, from execution time, delay time that has resulted from interrupt processing while electric power is controlled.

Patent Literature 5 discloses a processing system that executes, at a lower electric power consumption rate, a process that involves a time limit for a response. The processing system includes a hardware mechanism that changes, during a system operation, an operating frequency and a power supply voltage which are to be supplied to a processor.

CITATION LIST

Patent Literatures

[Patent Literature 1]
Japanese Patent Application Publication, Tokukai, No. 2010-166607 A (Publication Date: Jul. 29, 2010)
[Patent Literature 2]
Japanese Patent Application Publication, Tokukai, No. 2010-39791 A (Publication Date: Feb. 18, 2010)
[Patent Literature 3]
Japanese Patent Application Publication, Japanese Patent No. 4123640 (Publication Date: Jul. 23, 2008)
[Patent Literature 4]
Japanese Patent Application Publication, Tokukai, No. 2006-235907 A (Publication Date: Sep. 7, 2006)
[Patent Literature 5]
Japanese Patent Application Publication, Tokukai, No. 2002-304232 A (Publication Date: Oct. 18, 2002)

SUMMARY OF INVENTION

Technical Problem

Meanwhile, in a case where, for example, an electronic device executes a degenerate operation with a timing with which a user executes an operation that causes an application program (hereinafter referred to as "application") to be launched, the user experiences a substandard operating feel of the electronic device such as "sluggishness" or "poor responsiveness." This is because numerous calculations are involved in initialization that is executed when the application is launched.

Along with advancement of functionality of graphical user interface (GUI) with which electronic devices are equipped, there has been an increase in the amount of calculations necessary for a deactivation process of a launcher (i.e. process for delegating, after a launched application ends its operation, an input-output control of the user interface to the application). In a case where the deactivation process is carried out while an electronic device is executing a degenerate operation, a user, again, experiences substandard operating feel.

That is, there are cases where maintenance of high usability of an electronic device is to be prioritized over a reduction in electric power consumption, depending on the usage status of a user. In such cases, inhibition of the degenerate operation of the electronic device is desirable.

The device disclosed in Patent Literature 1 has a unique hardware configuration. This makes it impossible to increase a clock frequency in accordance with an identified process that is dependent only on the CPU. Therefore, the device is incapable of inhibiting the degenerate operation of an electronic device in accordance with any process executed by the electronic device. The device disclosed in Patent Literature 2 sets the clock frequency of the CPU to the predetermined rate whenever receiving key input of the user even in a case where no computation load is applied to the CPU. This makes it impossible to effectively reduce the electric power consumption.

Meanwhile, the device and the systems disclosed in Patent Literatures 3, 4, and 5 cause adverse effects (such as necessitating unnecessary calculations) or have a limited range of applications. Specifically, according to the system of Patent Literature 3, it is not possible for an electronic device to learn, in advance, how many calculations are required for launching an application. This prevents the system from properly inhibiting the degenerate operation. The device disclosed in Patent Literature 4 is merely effective in such a specific process as "interrupt processing." This makes it impossible for the device to handle complex tasks such as the launch of application.

The system of Patent Literature 5 changes the operating frequency only after detecting the delay in a given process. Therefore, a process for changing the operating frequency may not be executed in time for the inhibition of the degenerate operation. In short, none of the conventional technologies disclosed in the above patent literatures improves an operating feel of a user by effectively inhibiting the degenerate operation.

The present invention has been made in view of the problem, and it is an object of the present invention to provide an inhibition device and the like that enable, by inhibiting a degenerate operation of an electronic device in accordance with a usage status of a user, the electronic device to efficiently consume electric power without interfering with an operating feel of the user.

Solution to Problem

In order to attain the object, an inhibition device in accordance with one aspect of the present invention is an inhibition device for transmitting, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being capable of obtaining, from an electronic device that includes an input screen capable of detecting a location specified by a user, location information on the location, the inhibition device including: first obtaining means for obtaining, from the controlled device, the location information on the location specified by the user; first determining means for determining, in accordance with the location information obtained by the first obtaining means, whether or not an operation of the user is an operation for causing the controlled device to execute a predetermined process; and transmitting means for transmitting the inhibition information in a case where the first determining means determines that the operation of the user is an operation for causing the controlled device to execute the predetermined process.

In order to attain the object, a method of controlling the inhibition device in accordance with one aspect of the present invention is a method of controlling an inhibition device, said inhibition device being configured to transmit, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being capable of obtaining, from an electronic device that includes an input screen capable of detecting a location specified by a user, location information on the location, said method including: a first obtaining step of obtaining, from the controlled device, the location information on the location specified by the user; a first determining step of determining, in accordance with the location information obtained in the first obtaining step, whether or not an operation of the user is an operation for causing the controlled device to execute a predetermined process; and a transmitting step of transmitting the inhibition information in a case where it is determined in the first determining step that the operation of the user is an operation for causing the controlled device to execute the predetermined process.

Advantageous Effects of Invention

With an inhibition device and a method of controlling the inhibition device in accordance with one aspect of the present invention, it is possible to inhibit a controlled device from operating in a second state in accordance with a usage status of a user. Therefore, the inhibition device and the method of controlling the inhibition device bring about such an effect as allowing the controlled device to efficiently consume electric power without interfering with an operating feel of the user.

DESCRIPTION OF EMBODIMENTS

The following description will discuss embodiments of the present invention with reference to FIGS. 1 through 5.

[Overview of Smartphone 100]

Figure 1:
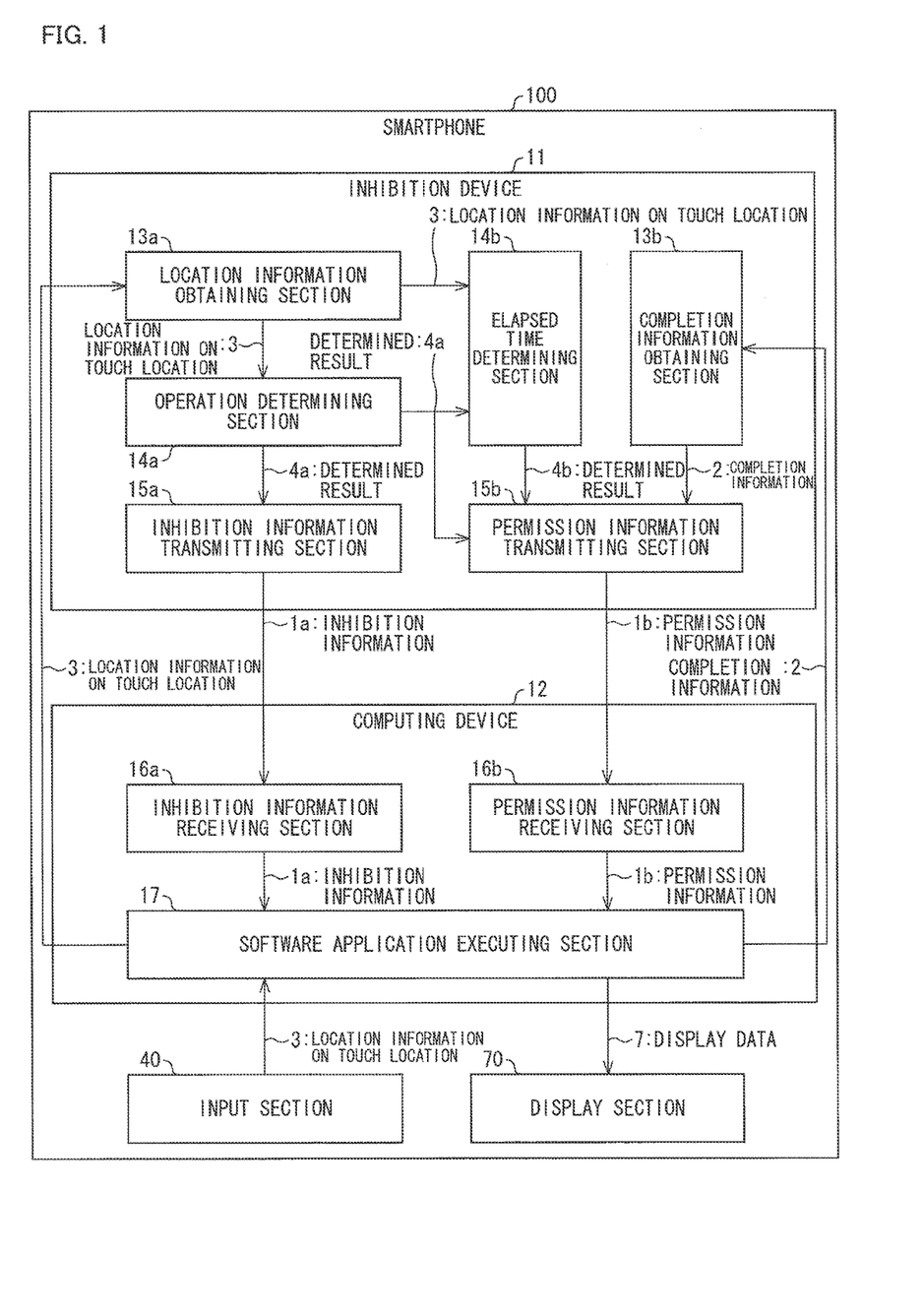
FIG. 1 is a block diagram illustrating a main configuration of a smartphone in accordance with an embodiment of the present invention.

An overview of a smartphone 100 will be described below with reference to FIG. 1. FIG. 1 is a block diagram illustrating a main configuration of the smartphone 100 in accordance with the present embodiment.

The smartphone (electronic device) 100 includes an input screen capable of detecting a location specified by a user operation, and at least includes an inhibition device 11 and a computing device 12. The present embodiment will employ the smartphone 100 as an example of an electronic device. Note, however, that the electronic device is not limited to a smartphone, but can be a tablet device, a personal computer, or any other electronic devices.

The smartphone 100 is also equipped with a Graphical User Interface (GUI), and contains a plurality of applications that are executable in the computing device 12. A user can cause the computing device 12 to execute a desirable application by selecting an icon or the like on the GUI.

The computing device (controlled device) 12 is a device that is (i) capable of obtaining location information on a touch location (location specified by a user operation) 3 from the smartphone 100 that includes the input screen capable of detecting the touch location 3 and (ii) capable of operating either in (a) a normal state (first state) in which the computing device 12 executes a process at a normal performance level (predetermined performance level) or (b) a degenerate state (second state) in which the computing device 12 executes a process at a performance level lower than the normal performance level.

Note that the "degenerate state" refers to a state in which electric power consumption and performance level are reduced. Examples of a method for the reduction encompass (i) suspending part of the functions of the computing device 12 and (ii) changing a frequency, a voltage, or the like at which the computing device 12 operates. The "normal state" refers to a state that is not the degenerate state. The "normal performance level" refers to a performance level at which the computing device 12 operates in the normal state.

The inhibition device 11 is a device that transmits, to the computing device 12 which is capable of obtaining location information on the touch location 3 from the smartphone 100 that includes the input screen capable of detecting the touch location 3, inhibition information 1a for inhibiting the computing device 12 from transitioning from the normal state, in which the computing device 12 executes a process at the normal performance level, to the degenerate state in which the computing device 12 executes a process at a performance level lower than the normal performance level.

In a case where the location information on the touch location 3 is supplied from the computing device 12 to the inhibition device 11, the inhibition device 11 determines, based on the touch location 3, whether or not a user operation is an operation for causing the computing device 12 to execute a predetermined process (i.e., process for launching an application). Then, in a case where the inhibition device 11 determines that the user operation is an operation for the execution of the predetermined process, the inhibition device 11 transmits the inhibition information 1a to the computing device 12. In a case where the inhibition information 1a is supplied from the inhibition device 11 to the computing device 12, the computing device 12 executes the predetermined process in the normal state.

That is, the inhibition device 11 can release the computing device 12 from the operation in the degenerate state only at a timing with which a computation load is applied to the computing device 12 (i.e., timing with which the user touches an icon with his/her finger in order to launch application). This allows, in a case where the user operation is an operation for causing the computing device 12 to execute the predetermined process, the inhibition device 11 to prevent the user from experiencing a substandard operating feel such as "sluggishness" or "poor responsiveness."

The inhibition device 11 is also capable of intensively supplying electric power to the computing device 12 only with a timing with which a computation load is applied to the computing device 12. This allows the computing device 12 to efficiently consume electric power.

Note that the computing device 12 is configured by processing devices, such as a CPU (Central Processing Unit), which is capable of executing a given computation process (program). The inhibition device 11 can be realized by causing the processing device to execute a program which is stored in a storage device such as RAM (Random Access Memory) or a flash memory.

In such a case, the inhibition device 11 is realized as part of functions of (i) an OS (Operating System; OS) that is to be mounted on the smartphone 100 and is capable of multitask processing, (ii) a launcher to be executed on the GUI (application with an interface designed for launching any application), or the like. The OS allows, by storing the launcher in a volatile storage device memory in advance, a user to operate the launcher via a user interface.

In a case where the inhibition device 11 and the computing device 12 are thus realized, the details of the realization are as follows: With a timing with which the user places his/her finger on an icon displayed on the launcher, the launcher transmits, to the OS, location information (on touch location 3) indicating that the application may become launched. Then, the OS transmits, to the CPU, a command (inhibition information 1a) to inhibit its degenerate operation.

Note that such an operation is "presumptive operation" which is executed immediately after the input screen (input section 40) detects the user's placement of his/her finger on the icon. In a case where the user shifts his/her finger from the icon and the icon is therefore not selected after all, the OS (or launcher) (i) determines that the "finger placement" operation was not an operation for selecting the icon and (ii) transmits, to the CPU, information (permission information 1b) indicating that the degenerate operation of the CPU is permitted.

Figure 2:
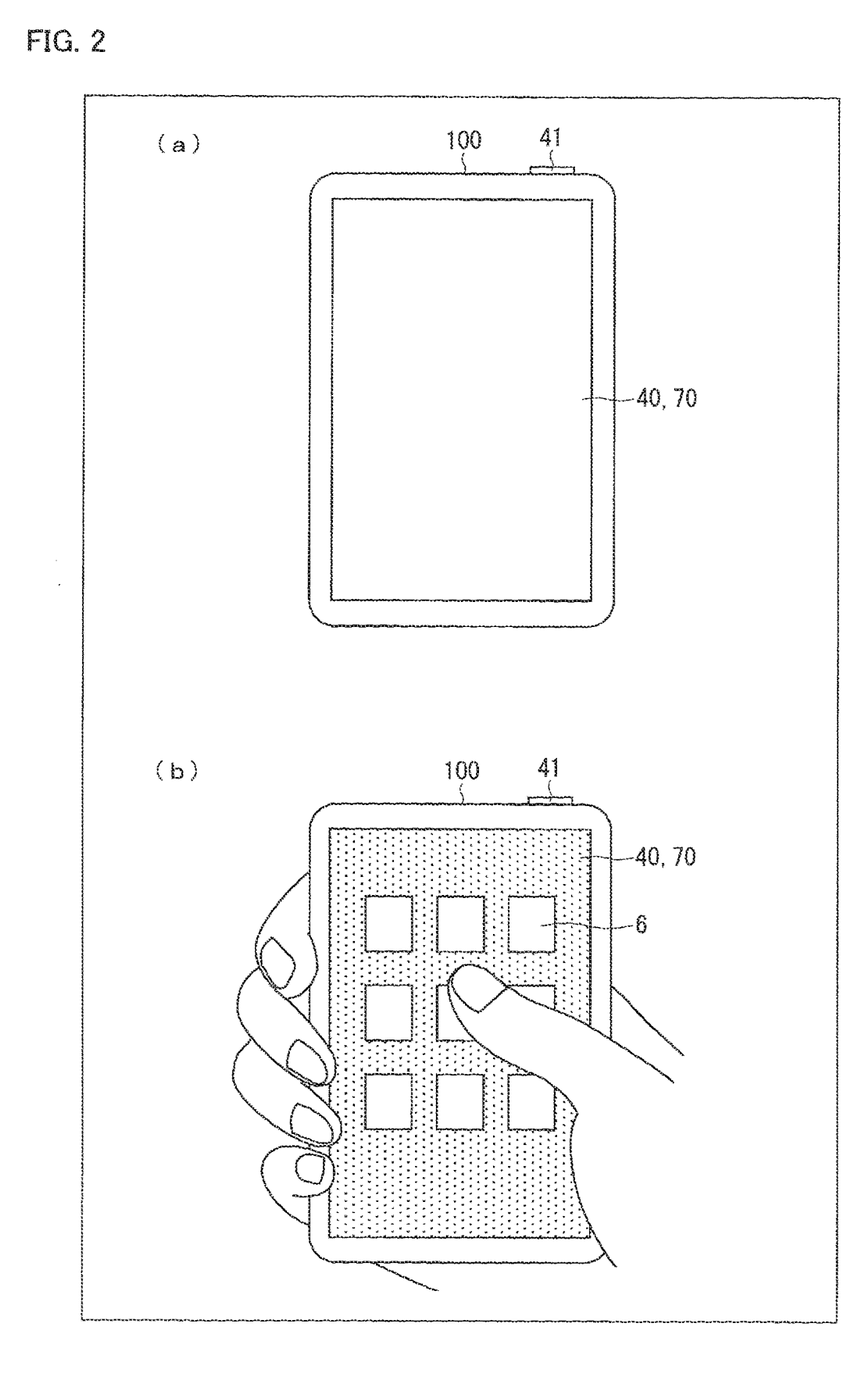
FIG. 2 is a set of views (a) and (b), (a) of FIG. 2 schematically illustrating an external appearance of the smartphone and (b) of FIG. 2 schematically illustrating how a user uses the smartphone.

An example of an external appearance and operation of the smartphone 100 will be described below with reference to FIG. 2. (a) of FIG. 2 is a view schematically illustrating the external appearance of the smartphone 100. (b) of FIG. 2 is a view schematically illustrating how a user uses the smartphone 100.

As illustrated in (a) of FIG. 2, the smartphone 100 includes the input section 40, a display section 70, and a power supply switch 41. Note that, in FIG. 1, the input section 40 and the display section 70 are separately illustrated for the clarification of respective functions of the members. However, both the members can be integrated as illustrated in (a) of FIG. 2 in a case where the input section 40 and the display section 70 are realized as a touch panel and a liquid crystal display, respectively.

As illustrated in (b) of FIG. 2, a user can select an icon 6 by specifying to the smartphone 100 a location on the input screen included in the input section 40 (i.e. by providing the smartphone 100 with the location information on the touch location 3) through touching the input screen. The computing device 12 executes a process identified by the icon (e.g. process for launching an application identified by the icon).

The following description and (b) of FIG. 2 assume a case where a right-handed user is holding the smartphone 100 with his/her right hand, and that a right thumb touches the input screen. Note, however, that a hand to hold and operate the smartphone 100 can be a right or left hand, and that a finger to touch the input screen does not need to be a thumb.

In addition, a user can use a navigating tool such as a stylus, instead of a finger, can be used for operating the smartphone 100. In other words, the concept of "user operation" in the following description encompasses operations executed by "a user's finger" and "a navigating tool such as a stylus."

Furthermore, the following description and (b) of FIG. 2 assume that "a user places his/her finger on the input screen." However, in a case where the input screen included in the input section 40 is a touch panel capable of detecting a finger in proximity, the smartphone 100 can operate as though the finger in the proximity of the input screen was touching the input screen. In other words, the concept of "touch" in the following description encompass the concept of "being in proximity." Note, however, that the following description will merely employ the term "touch" (e.g. "touch location 3") in order to ensure the simplicity of the description.

[Configuration of Smartphone 100]

A configuration of the smartphone 100 in accordance with the present embodiment will be described below with reference to FIG. 1. Note that, for simplicity, the description of the configuration and the block diagram omit members that are not closely related to the implementation of the present embodiment. Under given circumstances, however, the smartphone 100 can include such members.

The following description will discuss respective functions of the input section 40, a location information obtaining section 13a, an operation determining section 14a, an inhibition information transmitting section 15a, an elapsed time determining section 14b, a completion information obtaining section 13b, a permission information transmitting section 15b, an application executing section 17, an inhibition information receiving section 16a, a permission information receiving section 16b, and a display section 70 in this order.

The input section 40 transmits, to the application executing section 17, information (location information on a touch location 3) on two-dimensional coordinates of a location on the input screen, which location has been touched by a user. According to the present embodiment, the smartphone 100 preferably includes, as an input section 40, a touch panel capable of detecting multi-touch operations (i.e. the "input screen" is included in the input section 40). Note, however, that the type of hardware to be used for the input section 40 is not limited to a touch panel, provided that the input section 40 includes an input device that is capable of detecting a touch location 3 based on a user operation.

The location information obtaining section (first obtaining means) 13a obtains the location information on the touch location 3 from the computing device 12. Specifically, the location information obtaining section 13a receives the location information on the touch location 3 from the application executing section 17, and then transmits the location information on the touch location 3 to (i) the operation determining section 14a and (ii) the elapsed time determining section 14b.

In accordance with the location information on the touch location 3 obtained from the location information obtaining section 13a, the operation determining section (first determining means) 14a determines whether or not the user operation is an operation for causing the computing device 12 to execute a predetermined process. Note that the term "predetermined process" means a process for launching an application which is associated with the icon 6 that has been selected by the user.

Specifically, in a case where the operation determining section 14a receives the location information on the touch location 3 from the location information obtaining section 13a, the operation determining section 14a determines whether or not the touch location 3 (location on a display screen which location corresponds to the touch location 3) matches a location on which the icon 6 is displayed. This is how the operation determining section 14a determines whether or not the user has selected the icon 6. Then, the operation determining section 14a transmits a determined result 4a to (i) the inhibition information transmitting section 15a and (ii) the elapsed time determining section 14b.

In a case where the operation determining section 14a determines the user operation is an operation for causing the predetermined process to be executed, the inhibition information transmitting section (transmitting means) 15a transmits inhibition information 1a to the computing device 12. Specifically, in a case where the determined result 4a transmitted from the operation determining section 14a indicates that "the user has selected the icon 6", the inhibition information transmitting section 15a transmits the inhibition information 1a to the inhibition information receiving section 16a.

The inhibition information transmitting section 15a transmits the inhibition information 1a during a period between (i) a point in time where the operation determining section 14a determines the user operation is an operation for causing the predetermined process to be executed and (ii) a point in time where the computing device 12 executes the predetermined process. In other words, the inhibition information transmitting section 15a can transmit the inhibition information 1a at any point in time between (a) a point in time where the user touches the input screen and (b) a point in time where an initializing process for launching the application is initiated.

In a case where the operation determining section 14a determines the user operation is an operation for causing the predetermined process to be executed, the elapsed time determining section (second determining means) 14b determines whether or not a predetermined length of time has elapsed since the point in time where the location information obtaining section 13a obtained the location information on the touch location 3.

Specifically, in a case where the location information on the touch location 3 is supplied from the location information obtaining section 13a, the elapsed time determining section 14b stores, in a predetermined memory or the like, time information on a time at which the location information on the touch location 3 was supplied to the elapsed time determining section 14b. In so doing, in a case where the operation determining section 14a supplies a determined result 4a indicating that "the user did not select the icon 6", the elapsed time determining section 14b deletes the time information thus stored in the memory or the like.

On the other hand, in a case where the operation determining section 14a supplies a determined result 4a indicating that "the user did select the icon 6", the elapsed time determining section 14b (i) determines, at fixed intervals, whether or not the predetermined length of time has elapsed since the location information on the touch location 3 was supplied and then (ii) transmits a determined result 4b to the permission information transmitting section 15b. Note that, although the predetermined length of time to which the operation determining section 14a refers for the determining process is preferably one second, the predetermined length of time can be longer or shorter than one second, depending on the properties of the application or the like. This is because of the following reason: The inhibition device 11 merely inhibits or permits the degenerate operation of the computing device 12. Therefore, even in a case where it takes more than one second to launch an application, the computing device 12 does not carry out the degenerate operation while making a large amount of calculations for launching the application. This sufficiently produces such an effect as not interfering with the operational feel of the user.

The completion information obtaining section (second obtaining means) 13b obtains, from the computing device 12, completion information 2 indicating that the predetermined process has ended. Specifically, the completion information obtaining section 13b (i) obtains the completion information 2 from the application executing section 17 and then (ii) transmits the completion information to the permission information transmitting section 15b.

In a case where the permission information transmitting section (transmitting means) 15b obtains the completion information 2 from the completion information obtaining section 13b, the permission information transmitting section 15b transmits, to the permission information receiving section 16b, permission information 1b that permits the computing device 12 to transition from the normal state to the degenerate state.

In the case where the inhibition device 11 is realized as part of the functions of an OS, a launcher, or the like as described earlier, the above-described process can be specifically realized by the following operation: In a case where, for example, the OS recognizes a timing with which control of the smartphone 100 is transferred to an application, the OS issues an instruction (permission information 1b) that permits the degenerate operation of the CPU. The timing can be (i) a timing with which an animation involved in the launch of the application ends or (ii) a timing with which a command for depicting an application to be launched is issued.

In a case where the permission information transmitting section 15b receives from the elapsed time determining section 14b a determined result 4b indicating that the "predetermined length of time has elapsed", the permission information transmitting section 15b transmits the permission information 1b to the permission information receiving section 16b.

The permission information transmitting section 15b further transmits permission information 1b, which permits the computing device 12 to transition from the normal state to the degenerate state, to the computing device 12 in a case where the following is true: After the inhibition information 1a was transmitted because the operation determining section 14 had determined the user operation was an operation for causing the predetermined process to be executed, the operation determining section 14a then determines another user operation is an operation for not causing the predetermined process to be executed, in accordance with location information on a touch location 3 which location information has been further supplied from the location information obtaining section 13a.

In a case where the application executing section (executing means) 17 receives the inhibition information 1a from the inhibition information receiving section 16a, the application executing section 17 executes the predetermined process in the normal state. Specifically, in a case where the inhibition information 1a is supplied from the inhibition information receiving section 16a to the application executing section 17, the application executing section 17 executes the predetermined process that is specified by the icon 6 selected by the user (e.g. process for launching an application associated with the icon 6).

In addition, in a case where the application executing section 17 receives the location information on the touch location 3 from the input section 40, the application executing section 17 transmits the location information on the touch location 3 to the location information obtaining section 13a.

Furthermore, in a case where the application executing section 17 receives the permission information 1b from the permission information receiving section 16b, the application executing section 17 executes the predetermined process either in the normal state or in the degenerate state. In a case where the application executing section 17 ends the predetermined process for launching the application, the application executing section 17 transmits the completion information 2 to the completion information obtaining section 13b.

The inhibition information receiving section (receiving means) 16a receives the inhibition information 1a transmitted from the inhibition device 11, and then transmits the inhibition information 1a to the application executing section 17.

The permission information receiving section (receiving means) 16b receives, from the inhibition device 11, the permission information 1b that permits the transition from the normal state to the degenerate state. Then, the permission information receiving section 16b transmits the permission information 1b to the application executing section 17.

The display section 70 is a device for displaying an image based on display data 7 that is transmitted from the computing device 12 (i.e. the "display screen" is included in the display section 70). According to the present embodiment, the display section 70 is assumed to be primarily a liquid crystal display (Liquid Crystal Display; LCD). Note, however, that the type of hardware to be used for the display section 70 is not particularly limited, provided that the display section 70 is a device (particularly a flat panel display) that is equipped with display functionality. For example, the display section 70 can be a device which includes (i) a display element such as a plasma display (Plasma Display Panel; PDP) or an EL (Electroluminescence) display, (ii) a driver circuit for driving the display element in accordance with the display data 7, and (iii) the like.

In the case where, as described earlier, the input section 40 and the display section 70 are realized by a touch panel and a liquid crystal display, respectively, the input section 40 and the display section 70 can be integrated (see FIG. 2). Specifically, the input section 40 can (i) include an input screen made of a transparent, transmissive material such as a glass having a rectangular shape and (ii) cover the display screen of the display section 70 so as to be integrated with the display section 70. This allows for a match between (a) the touch location 3 of the input screen of the input section 40, which touch location 3 is specified by the finger of the user and (b) a location at which the display section 70 displays a graphic or the like in response to the touch of the user. Therefore, the user can experience a natural input feel.

[Operation of Application]

Figure 3:
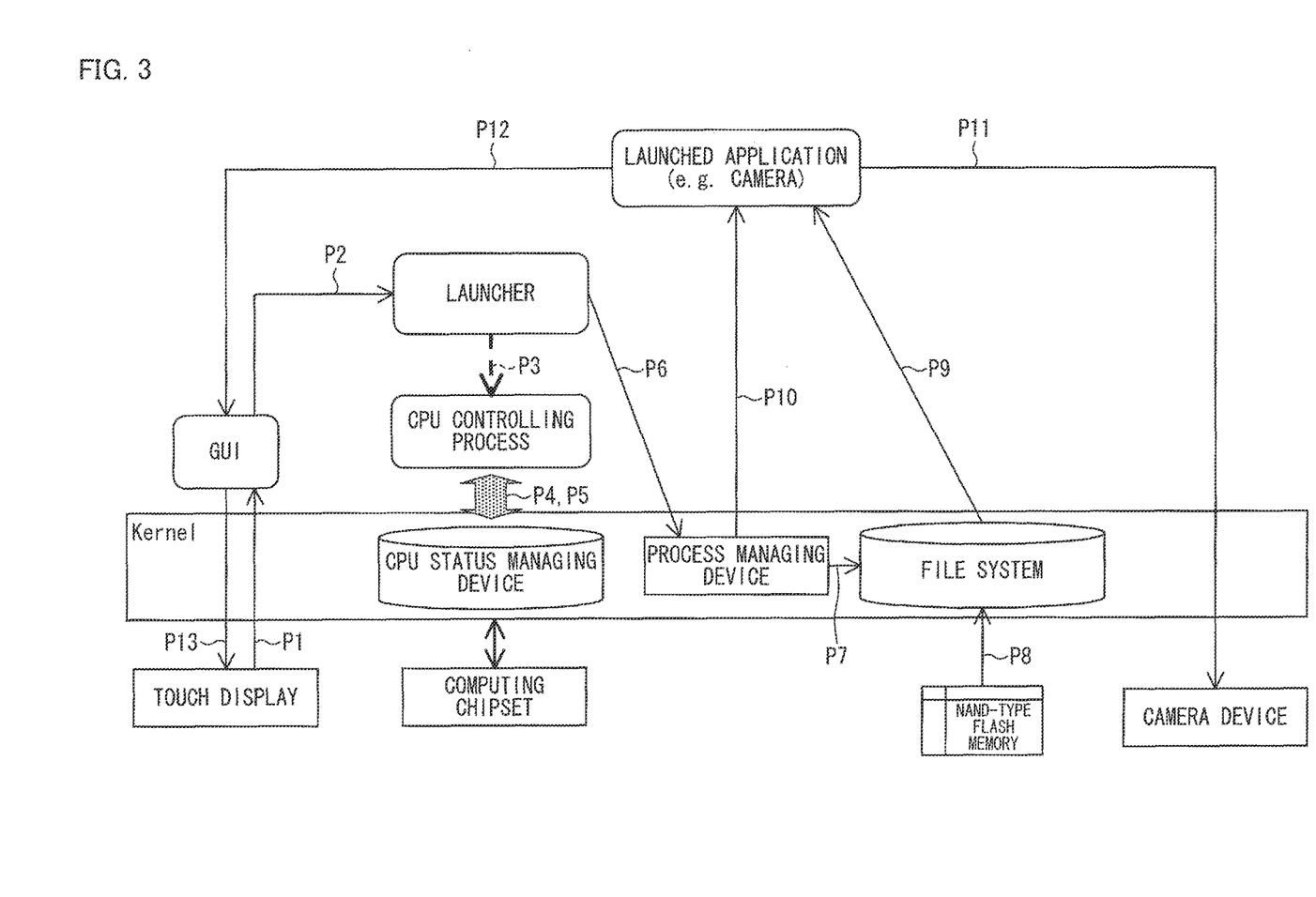
FIG. 3 is a schematic diagram illustrating a specific configuration of the smartphone.
Figure 4:
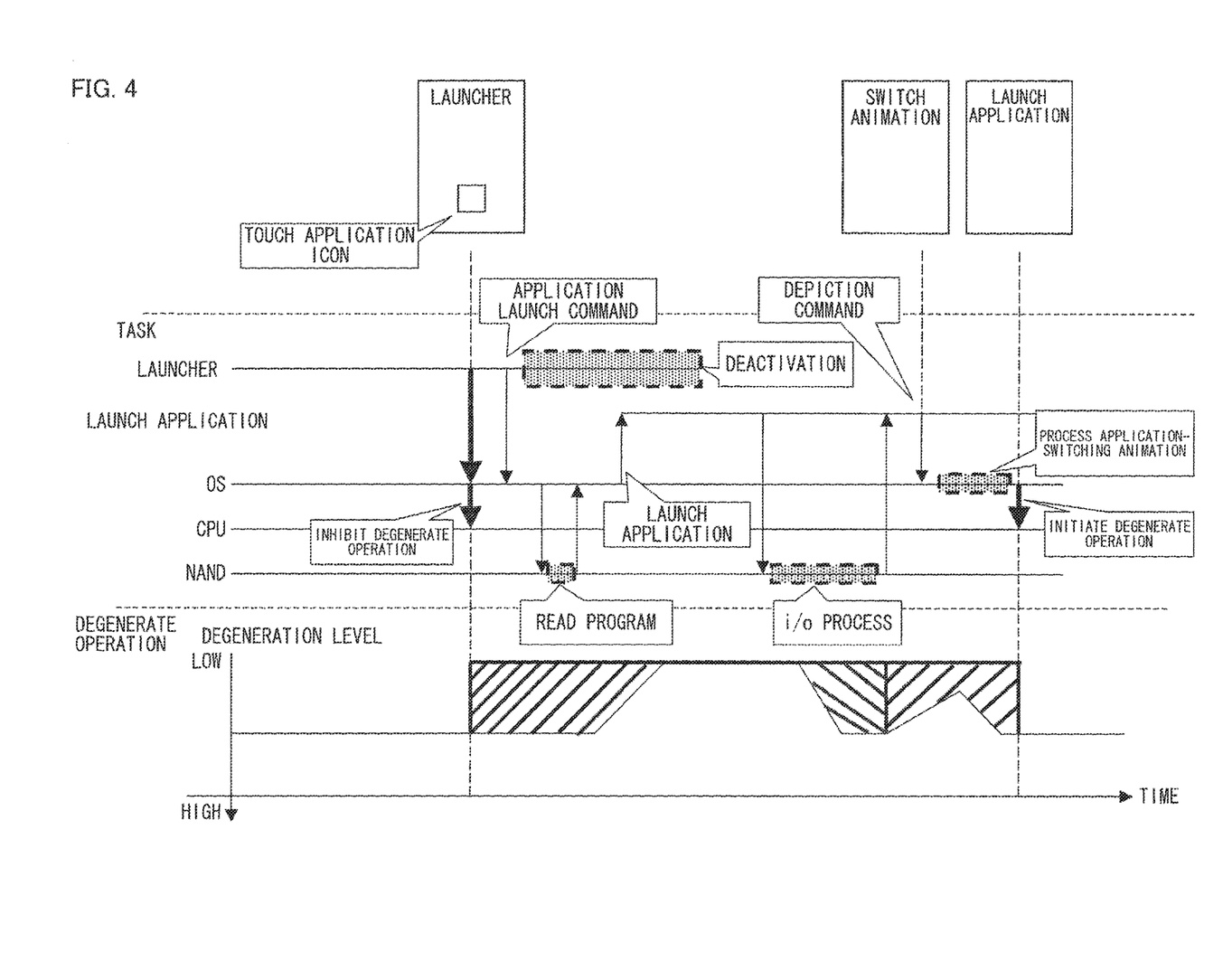
FIG. 4 is a timing chart illustrating a flow of a specific process of the smartphone.

The following description will discuss, with reference to FIGS. 3 and 4, a more specific configuration of the smartphone 100 in the case where the inhibition device 11 is realized as part of the functions of an OS, a launcher, or the like that has GUI functionality. FIG. 3 is a diagram schematically illustrating the specific configuration of the smartphone 100. FIG. 4 is a timing chart showing a flow of a specific operation of the smartphone 100.

The following is a list of what reference signs indicate:
P1: User's screen touch and transmission (of information on location touched by user), P2: Transmission of information on screen touch and its location to application, P3: Request for inhibition of degenerate operation of CPU, P4: Inhibition of degenerate operation, P5: Command to recover from inhibited state after 1 second, P6: Command to launch application, P7: Command to expand program memory, P8: Read out data from NAND-type flash memory (inverted AND-type flash memory), P9: Write in program-executable memory, P10: Command to execute application, P11: Initialization of camera hardware as part of initialization process, P12: Depiction Command, and P13: Depict graphic on display (display section 70).

When launched, an application executes initialization. There are two types of initialization. One of them is an initialization process (first initialization process) pre-programmed in an OS. According to the first initialization process, an executable program of the application is stored in a volatile storage device memory, and then initialization information is provided in a memory space. In so doing, if a dynamic-link library is required, a file of the dynamic-link library is searched out, and is then made available. In addition, according to the first initialization process, information (such as a size of a display screen), which is necessary for realization of a GUI, is obtained so that a necessary process is executed. In a case where the OS is equipped with a security function, it is determined whether or not the program meets predetermined conditions regarding the security.

The other one of the two is an initialization process (second initialization process) that is unique to each application. The second initialization process is to be executed by use of a function which is called after the completion of the first initialization process. It should be noted that a function to be called is generally a main function, but may vary, depending on the circumstances.

The details of the second initialization process encompass (i) reading out data from a database, (ii) initializing a device driver such as that of a camera, and (iii) connecting to a network. The second initialization process is continued until the application is in an operable state in which the application is available for use by the user. In general, the operable state is a state in which an initial screen of an application can be depicted. Thus, in a case where the application issues to the OS a depiction command to depict an image, the OS transfer the control of the smartphone 100 to the application.

Note that in order to let the user be aware of switching between a launcher and an application, it is possible for a GUI to display an animation such as a fade-in by use of information regarding respective screens of the launcher and of the application. The animation can be displayed, by the OS, during a period between (i) a point in time where the OS receives the depiction command and (ii) a point in time where the OS transfers the control to the application. In order for the control to be smoothly transferred to the application, the launcher can, while the application is executing the initialization process for the launch, execute a suspension process such as (a) reserving information which is stored in RAM and (b) capturing the screen.

Note that, in a case where the suspension process of the launcher has not ended at a point in time where the control is transferred to the launched application, the launcher can (i) inhibit the degenerate operation until the suspension process ends and (ii) permits the degenerate operation with the completion of the suspension process as a trigger for such permission.

While a process for launching an application normally requires a large amount of calculation, the computing device 12 does not have, in advance, knowledge of how much calculation would be required. Therefore, in a case where the inhibition device 11 determines that a user operation is an operation for the execution of a process for causing the computing device 12 to launch the application, the inhibition device 11 issues, to the computing device 12, a command (inhibition information 1a) to inhibit the degenerate operation. That is, the inhibition device 11 is capable of causing the computing device 12 to execute a high-speed process for launching the application. This improves the user's operating feel.

While the computing device 12 is executing the process for launching the application, there is a possibility that a variety of interrupt processing can occur, such as input-output control. Since the inhibition device 11 can inhibit the computing device 12 from operating in the degenerate state while launching the application, it is possible for the computing device 12 to launch the application at a stable speed.

Because of the above inhibition process, the inhibition device 11 can also allow the computing device 12 to execute a high-speed process for deactivating the launcher.

Note that, in FIG. 3, "computing chipset" is not only related with CPU-status managing device" but also interrelated with "Kernel" on the whole. In other words, it is assumed that the computing chipset is provided with an external memory. The inhibition device 11 can have a general configuration in which a memory, a clock generator, and the like are included.

[Process to be Executed by Smartphone 100]

Figure 5:
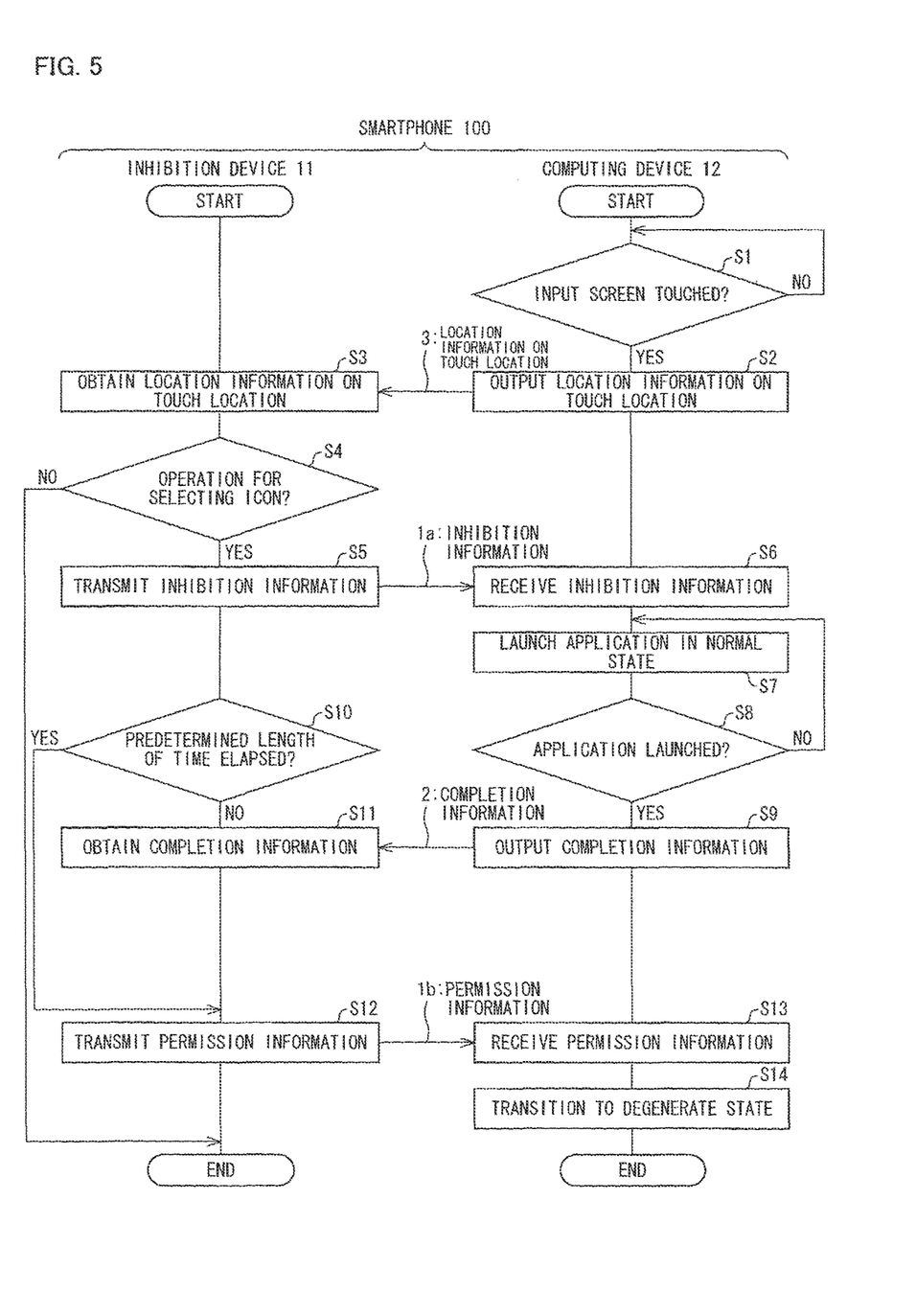
FIG. 5 is a flow chart illustrating the process to be executed by the smartphone.

A flow of a process to be executed by the smartphone 100 will be described below with reference to FIG. 5. FIG. 5 is a flow chart illustrating the process to be executed by the smartphone 100.

In a case where the input screen of the input section 40 detects a touch operation of a user (YES in Step 1: hereinafter, the steps are abbreviated as "step 1" is "S1"), the application executing section 17 supplies location information on a touch location 3 to the location information obtaining section 13a (S2). The location information obtaining section 13a obtains the location information on the touch location 3 which has been supplied from the input section 40 (S3, First obtaining step), and then the operation determining section 14a determines whether or not a user operation was to select an icon 6 (S4, First determining step). In a case where it is determined that the user operation was to select the icon 6 (YES in S4), the inhibition information transmitting section 15a transmits inhibition information 1a to the computing device 12 (S5, Transmitting step).

The inhibition information receiving section 16a receives the inhibition information 1a (S6), and then the application executing section 17 executes the application in the normal state (S7). In so doing, the elapsed time determining section 14b determines, at fixed intervals, whether or not a predetermined length of time has elapsed since the above time at which the location information obtaining section obtained the location information on the touch location 3 (S10). In a case where the application executing section 17 ends the process for launching the predetermined application (YES in S8), the application executing section 17 transmits completion information 2 (S9).

In a case where the completion information obtaining section 13b receives the completion information 2 (S11) or the predetermined length of time has elapsed (YES in S10), the permission information transmitting section 15b transmits permission information 1b to the computing device 12 (S12). In a case where the permission information receiving section 16b receives the permission information (S13), the computing device 12 executes the process in the degenerate state (S14).

[Effect of Inhibition Device 11]

The inhibition device 11 is capable of inhibiting, in accordance with a usage status of a user, the operation of the computing device 12 in the degenerate state. This brings about such an effect that the inhibition device 11 can allow the computing device 12 to efficiently consume electric power without interfering with the operating feel of the user.

Specifically, in a case where, for example, the user launches an application for controlling an image capturing device (e.g. typical camera; not illustrated in FIG. 1 or FIG. 2) mounted on the smartphone 100, the inhibition device 11 can reduce, by approximately 35%, a length of processing time required for the computing device 12 to complete launching the application. In other words, the inhibition device 11 is capable of causing the computing device 12 to swiftly execute the process required for launching the application.

[Modifications]

The above example, in which the inhibition device 11 is realized as part of the functions of an OS, a launcher, or the like, discussed the conditions in which the launcher can cause the application to be launched. Alternatively, it is also possible that another process or library running on the smartphone 100 inhibits the degenerate operation, in accordance with the operation of the launcher.

In addition, in the above example, the OS issues to the CPU a command (inhibition information 1a) to inhibit the degenerate operation with the timing with which the application is launched. Alternatively, it is also possible to (i) prepare, in advance, a process or library that obtains information regarding a state in which a process for launching an application is completed and (ii) cause the process or library to issue a command to inhibit the degenerate operation.

In addition, in the above example, the GUI is included in the OS. Alternatively, it is also possible to (i) cause the GUI to be executed as a library or process, apart from the OS or (ii) cause the GUI to determine the launch status of an application and then to issue a permission (permission information 1b) for the degenerate operation.

Furthermore, in the above example, the OS cancels the inhibition of degenerate operation at predetermined time. Alternatively, it is also possible to for this process to be executed by a process or library which is separately prepared.

[Other Ways of Describing Smartphone 100]

The inhibition device 11 in accordance with the present embodiment can also be described as:

(1) an inhibition device for transmitting, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being capable of (i) obtaining, from an electronic device that includes an input screen capable of detecting a location specified by a user, location information on the location as well as (ii) outputting a plurality of icons, the inhibition device including:

(2) first obtaining means for obtaining, from the controlled device, the location information on the location specified by the user;

(3) first determining means for determining, by determining whether or not there is a match between the location and a location from which an icon is outputted, whether or not an operation of the user is an operation for causing the controlled device to execute a predetermined process specified by the icon; and (4) transmitting means for transmitting the inhibition information in a case where the first determining means determines that the operation of the user is an operation for causing the controlled device to execute the predetermined process.

Alternatively, the inhibition device 11 in accordance with the present embodiment can also be described as:

(1) an inhibition device for transmitting, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being (i) capable of obtaining, from an electronic device that includes an input screen capable of detecting a location specified by a user, location information on the location and (ii) capable, because an icon can be identified in accordance with the location specified by the user, of executing a process that is specified by the icon, the inhibition device including:

(2) obtaining means for obtaining execution information indicating that the controlled device is to execute, because the icon has been identified, a process for launching an application specified by the icon; and (3) transmitting means for transmitting the inhibition information in a case where the obtaining means obtains the execution information.

[Combination of Configurations (Technical Means) Included in Embodiment]

It should be noted that the configurations included in the above embodiment can be combined as desired. That is, all or part of the configurations described in the embodiment can be employed in combination not only in the above embodiment but also in any other embodiment. Any embodiment derived from such combination of the configurations is also encompassed in the technical scope of the present invention.

In other words, the present invention is not limited to the description of the embodiment, but can be altered in many ways by a person skilled in the art within the scope of the claims. An embodiment derived from a proper combination of technical means disclosed in different embodiments is also encompassed in the technical scope of the present invention.

[Software Implementation Example]

Blocks of the inhibition device 11, the computing device 12, and the smartphone 100 may be realized by means of hardware by a logic circuit provided in an integrated circuit (IC chip) or the like or may be realized by means of software as executed by a CPU.

In the latter case, the inhibition device 11, the computing device 12, and the smartphone 100 each include (I) a CPU for executing a command of a program for achieving a function, (II) storage devices (storage media) such as, (i) a ROM (Read Only Memory) for storing the program, (ii) a RAM (Random Access Memory) for extracting the program, (iii) a memory for storing the program and various data, and (III) the like. The object of the present invention can also be attained by (a) providing a storage medium in each of the inhibition device 11, the computing device 12, and the smartphone 100, the storage medium having stored (in a computer-readable manner) program codes (executable program, intermediate code program, and source program) of a control program for each of the tuner section 1 and the display section 2, which control program is a piece of software for achieving the function and (b) causing a computer (or CPU or MPU) to read out and then execute the program codes thus stored in the storage medium.

Examples of the storage medium encompass (i) tapes such as a magnetic tape and a cassette tape, (ii) disks including magnetic disks such as a floppy disk (Registered Trademark) and a hard disk and optical disks such as a CD-ROM, an MO, an MD, a DVD, and a CD-R, (iii) cards such as an IC card (including a memory card) and an optical card, (iv) semiconductor memories such as a mask ROM, an EPROM, an EEPROM (Registered Trademark), and a flash ROM, and (v) logic circuits such as a PLD (Programmable logic device) and an FPGA (Field Programmable Gate Array).

Furthermore, the inhibition device 11, the computing device 12, and the smartphone 100 can each be configured to be connectable to a communications network so that a program code is made available, via the communications network, to each of the inhibition device 11, the computing device 12, and the smartphone 100. The communications network is not limited to any particular one, provided that the program code can be transmitted via the communications network. Examples of the communications network encompass the Internet, an intranet, an extranet, a LAN, an ISDN, a VAN, a CATV communications network, a virtual dedicated network (virtual private network), a telephone line network, a mobile communications network, and a satellite communications network. A transfer medium for configuring the communications network need only be a medium via which the program code can be transmitted, and is not limited to any particular configuration or any type. Examples of the transfer medium encompass (i) wired lines such as IEEE 1394, a USB, an electric power line, a cable TV line, a telephone line, and an ADSL (Asymmetric Digital Subscriber Line) and (ii) wireless communications such as an infrared radiation (e.g. IrDA and remote control), Bluetooth (Registered Trademark), IEEE 802.11 wireless, HDR (High Data Rate), NFC (Near Field Communication), DLNA (Digital Living Network Alliance), a mobile telephone network, a satellite line, and a terrestrial digital network.

According to the present specification, "means" does not necessarily refer to physical means only, but encompasses those whose functions are realized by software. In addition, a function of one item of means can be realized by two or more items of physical means, and functions of two or more items of means can be realized by one item of physical means.

[Summary]

The inhibition device (inhibition device 11) in accordance with Aspect 1 of the present invention is (1) an inhibition device for transmitting, to a controlled device, inhibition information (inhibition information 1a) that causes the controlled device (computing device 12) to be inhibited from transitioning from a first state (normal state), in which the controlled device executes a process at a predetermined performance level (normal performance level), to a second state (degenerate state) in which the controlled device executes the process at a performance level lower than the predetermined performance level, the controlled device being capable of obtaining, from an electronic device (smartphone 100) that includes an input screen capable of detecting a location (touch location 3) specified by a user, location information on the location, the inhibition device including:

(2) first obtaining means (location information obtaining section 13a) for obtaining, from the controlled device, the location information on the location specified by the user;

(3) first determining means (operation determining section 14a) for determining, in accordance with the location information obtained by the first obtaining means, whether or not an operation of the user is an operation for causing the controlled device to execute a predetermined process; and (4) transmitting means (inhibition information transmitting section 15a) for transmitting the inhibition information in a case where the first determining means determines that the operation of the user is an operation for causing the controlled device to execute the predetermined process.

A method of the controlling the inhibition device in accordance with Aspect 1 of the present invention is (1) a method of controlling an inhibition device, said inhibition device being configured to transmit, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being capable of obtaining, from an electronic device that includes an input screen capable of detecting a location specified by a user, location information on the location, said method including:

(2) a first obtaining step (S3) of obtaining, from the controlled device, the location information on the location specified by the user;

(3) a first determining step (S4) of determining, in accordance with the location information obtained in the first obtaining step, whether or not an operation of the user is an operation for causing the controlled device to execute a predetermined process; and (4) a transmitting step (S5) of transmitting the inhibition information in a case where it is determined in the first determining step that the operation of the user is an operation for causing the controlled device to execute the predetermined process.

According to the inhibition device of Aspect 1 configured as such and the method of controlling the inhibition device, (i) the location information on the location specified by the user is obtained and (ii) it is determined, in accordance with the location information, whether or not the user operation is an operation for causing the predetermined process to be executed. Then, in a case where it is determined that the user operation is an operation for causing the predetermined process to be executed, the inhibition information, which inhibition the transition from the first state to the second state, is transmitted to the controlled device.

As has been described, the conventional technologies have focused only on a reduction in electric power consumption of electronic devices. Specifically, according to the conventional technologies, a normal state (first state) and a degenerate state (second state) of an electronic device is switched between, only based on an operation status of the electronic device. That is, the conventional technologies have no regard for electric power control in accordance with a usage status of a user. The conventional technologies are therefore unable to handle cases where maintenance of high usability of an electronic device is to be prioritized over a reduction in electric power consumption.

According to the inhibition device and the method of controlling the inhibition device in accordance with Aspect 1, on the other hand, inhibition information is transmitted to the controlled device in a case where (i) a user operation is detected by an input screen (e.g. touch panel) and (ii) it can be determined that the user operation is an operation for causing controlled device to execute a predetermined process. This allows the inhibition device or the like to inhibit the controlled device from transitioning from the first state to the second state when the controlled device is to execute the predetermined process desired by the user.

In other words, the inhibition device or the like is capable of inhibiting, in accordance with the usage status of the user, the controlled device from operating in the degenerate state. Therefore, with the inhibition device and the method of controlling the inhibition device in accordance with Aspect 1 of the present invention, it is possible to allow the controlled device to efficiently consume electric power without interfering with an operating feel of the user.

An inhibition device in accordance with Aspect 2 of the present invention can be configured in Aspect 1 to further include:

(1) second obtaining means (completion information obtaining section 13b) for obtaining, from the controlled device, completion information (completion information 2) indicating that the controlled device has ended the predetermined process, (2) in a case where the second obtaining means obtains the completion information, the transmitting means (permission information transmitting section 15b) further transmitting permission information (permission information 1b) that permits the controlled device to transition from the first state to the second state.

According to the configuration, in a case where the inhibition device in accordance with Aspect 2 of the present invention obtains from the controlled device the completion information indicating that the controlled device has ended the predetermined process, the inhibition device transmits the permission information that permits the controlled device to transition from the first state to the second state. In other words, in a case where the controlled device ends a predetermined process presented by the user, the inhibition device permits the controlled device to operate in the degenerate state (second state) by transmitting the permission information to the controlled device.

Therefore, the inhibition device in accordance with Aspect 2 of the present invention is capable of allowing the controlled device to efficiently consume electric power without interfering with an operating feel of the user.

The inhibition device in accordance with Aspect 3 of the present invention can be configured in Aspect 1 or 2 to further include:

(1) second determining means (elapsed time determining section 14b) for determining, in a case where the first determining means determines that an operation of the user is an operation for causing the controlled device to execute the predetermined process, whether or not a predetermined length of time has elapsed since a time at which the first obtaining means obtained the location information, (2) in a case where the second determining means determines that the predetermined length of time has elapsed, the transmitting means transmitting, to the controlled device, permission information that permits the controlled device to transition from the first state to the second state.

According to the configuration, the inhibition device in accordance with Aspect 3 of the present invention determines, in a case where the first determining means determines that the user operation is an operation for causing the controlled device to execute the predetermined process, whether or not a predetermined length of time has elapsed since a time at which the first obtaining means obtained the location information on the location specified by the user. Then, in a case where it is determined that the predetermined length of time has elapsed, the inhibition device transmits the permission information to the controlled device.

There are cases where it is possible to expect how much time is required for the controlled device to execute each predetermined process presented by a user. Therefore, even in a case where the inhibition device in accordance with Aspect 3 of the present invention has not obtained the completion information from the controlled device, the inhibition device permits the controlled device to operate in the degenerate state if the predetermined length of time elapses since the user operation was detected.

Therefore, the inhibition device in accordance with Aspect 3 of the present invention is capable of permitting, in accordance with the length of processing time required for the predetermined process to be executed, the controlled device to operate in the degenerate state. Hence, the inhibition device in accordance with Aspect 3 of the present invention is capable of allowing the controlled device to efficiently consume electric power.

The inhibition device in accordance with Aspect 4 of the present invention can be configured in any one of Aspects 1 through 3 such that (1) the transmitting means further transmits, to the controlled device, permission information that permits the controlled device to transition from the first state to the second state in a case where, after the transmitting means transmits inhibition information because the first determining means determined that the operation of the user was an operation for causing the controlled device to execute the predetermined process, the first determining means determines, in accordance with location information which has been further obtained by the first obtaining means, that the operation of the user was not an operation for causing the controlled device to execute the predetermined process.

According to the configuration, inhibition device in accordance with Aspect 4 of the present invention further transmits permission information, which permits the controlled device to transition from the first state to the second state, to the controlled device in a case where the following is true: After the inhibition information was transmitted, it is determined, in accordance with a new location that has been further obtained, that the user operation is not an operation for causing the predetermined process to be executed.

In other words, in a case where the user operation once determined as an operation for causing the predetermined process to be executed can ultimately be determined (after the inhibition device transmits the inhibition information) as an operation for not causing the predetermined process to be executed, the inhibition device further transmits permission information in order to overrule the inhibition information that was transmitted earlier. This causes the inhibition device in accordance with Aspect 4 of the present invention to allow the controlled device to efficiently consume electric power.

The inhibition device in accordance with Aspect 5 of the present invention can be configured in any one of Aspects 1 through 4 such that (1) the transmitting means transmits the inhibition information during a period between (i) a point in time where the first determining means determines that an operation of the user is an operation for causing the controlled device to execute the predetermined process and (ii) a point in time where the controlled device executes the predetermined process.

According to the configuration, the inhibition device in accordance with Aspect 5 of the present invention transmits the inhibition information during a period between (i) a point in time where the first determining means determines that a user operation is an operation for causing the controlled device to execute the predetermined process and (ii) a point in time where the controlled device executes the predetermined process. This causes the inhibition device in accordance with Aspect 5 of the present invention to allow the controlled device to efficiently consume electric power without interfering with an operating feel of the user.

The inhibition device in accordance with Aspect 6 of the present invention can be configured in any one of Aspects 1 through 5 such that (1) the first determining means determines, in a case where the predetermined process is a process for launching an application, that an operation of the user is an operation for causing the controlled device to execute the predetermined process.

According to inhibition device in accordance with Aspect 6 of the present invention which is configured as such, the predetermined process is a process for launching an application. This causes the inhibition device in accordance with Aspect 6 of the present invention to allow, in a case where the user launches the application, controlled device to efficiently consume electric power without interfering with an operating feel of the user.

The controlled device in accordance with Aspect 1 of the present invention is (1) a controlled device (i) capable of obtaining, from an electronic device that includes an input screen capable of detecting a location specified by a user, location information on the location and (ii) capable of operating in both (but either one at a time) (a) a first state in which the controlled device executes a process at a predetermined performance level and (b) a second state in which the controlled device executes the process at a performance level lower than the predetermined performance level, the controlled device including:

(2) receiving means (inhibition information receiving section 16a) for receiving inhibition information transmitted from the inhibition device in accordance with any one of Aspects 1 through 6; and (3) executing means (application executing section 17) for executing, in the first state, the predetermined process in a case where the receiving means receives the inhibition information.

According to the configuration, the controlled device in accordance with Aspect 1 of the present invention executes the predetermined process in the first state in a case where the controlled device receives the inhibition information transmitted from the inhibition device. This allows the controlled device in accordance with Aspect 1 of the present invention to efficiently consume electric power without interfering with an operating feel of the user.

The controlled device in accordance with Aspect 2 can be configured in Aspect 1 such that:

(1) the receiving means (permission information receiving section 16b) further receives permission information which has been transmitted from the inhibition device and which permits the controlled device to transition from the first state to the second state; and (2) in a case where the receiving means receives the permission information, the executing means executes a process either in the first state or in the second state.

According to the configuration, in a case where controlled device in accordance with Aspect 2 of the present invention receives the permission information transmitted from the inhibition device, the controlled device executes the process either in the first state or in the second state. This allows the controlled device in accordance with Aspect 2 of the present invention to efficiently consume electric power without interfering with an operating feel of the user.

An electronic device (smartphone 100) in accordance with Aspect 1 of the present invention is (1) an electronic device including an input screen capable of detecting a location specified by a user, the electronic device including:

(2) an inhibition device in accordance with any one of Aspects 1 through 6; and (3) a controlled device in accordance with Aspect 1 or 2.

Therefore, the electronic device in accordance with Aspect 1 of the present invention is capable of efficiently consuming electric power without interfering with an operating feel of a user.

The inhibition device and the controlled device can each be realized by a computer. In such a case, the scope of the present invention encompass (i) a program allowing, by causing a computer to serve as each means included in the inhibition device and/or the controlled device, the inhibition device and/or the controlled device to be realized by the computer and (ii) a computer-readable storage medium in which the program is stored.

INDUSTRIAL APPLICABILITY

The present invention is applicable not only to a smartphone, but also to a tablet device, a personal computer, and other electronic devices and the like.

REFERENCE SIGNS LIST

1a Inhibition information
1b Permission information
2 Completion information
3 Location Information on touch location (location specified by user)
11 Inhibition device
12 Computing device (controlled device)
13a Location information obtaining section (first obtaining means)
13b Completion information obtaining section (second obtaining means)
14a Operation determining section (first determining means)
14b Elapsed time determining section (second determining means)
15a Inhibition information transmitting section (transmitting means)
15b Permission information transmitting section (transmitting means)
16a Inhibition information receiving section (receiving means)
163 Permission information receiving section (receiving means)
17 Application executing section (executing means)
100 Smartphone (electronic device)

The invention claimed:

1. An inhibition device for transmitting, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being capable of obtaining, from an electronic device that includes an input screen capable of detecting a location specified by a user, location information on the location, the inhibition device comprising:
first obtaining means for obtaining, from the controlled device, the location information on the location specified by the user;
first determining means for determining, in accordance with the location information obtained by the first obtaining means, whether or not an operation of the user is an operation for causing the controlled device to execute a predetermined process;
transmitting means for transmitting the inhibition information in a case where the first determining means determines that the operation of the user is an operation for causing the controlled device to execute the predetermined process; and
second obtaining means for obtaining, from the controlled device, completion information indicating that the controlled device has ended the predetermined process,
in a case where the second obtaining means obtains the completion information, the transmitting means further transmitting permission information that permits the controlled device to transition from the first state to the second state.

2. An inhibition device as set forth in claim 1, further comprising:
second determining means for determining, in a case where the first determining means determines that an operation of the user is an operation for causing the controlled device to execute the predetermined process, whether or not a predetermined length of time has elapsed since a time at which the first obtaining means obtained the location information,
in a case where the second determining means determines that the predetermined length of time has elapsed, the transmitting means transmitting, to the controlled device, permission information that permits the controlled device to transition from the first state to the second state.

3. The inhibition device as set forth in claim 1, wherein the transmitting means transmits the inhibition information during a period between (i) a point in time where the first determining means determines that an operation of the user is an operation for causing the controlled device to execute the predetermined process and (ii) a point in time where the controlled device executes the predetermined process.

4. The inhibition device as set forth in claim 1, wherein the first determining means determines, in a case where the predetermined process is a process for launching an application, that an operation of the user is an operation for causing the controlled device to execute the predetermined process.

5. A controlled device (i) capable of obtaining, from an electronic device that includes an input screen capable of detecting a location specified by a user, location information on the location and (ii) capable of operating in both (but either one at a time) (a) a first state, in which the controlled device executes a process at a predetermined performance level and (b) a second state in which the controlled device executes the process at a performance level lower than the predetermined performance level,
the controlled device comprising:
receiving means for receiving inhibition information transmitted from the inhibition device as set forth in claim 1; and
executing means for executing, in the first state, the predetermined process in a case where the receiving means receives the inhibition information.

6. The controlled device as set forth in claim 5, wherein:
the receiving means further receives permission information which has been transmitted from the inhibition device and which permits the controlled device to transition from the first state to the second state; and
in a case where the receiving means receives the permission information, the executing means executes a process either in the first state or in the second state.

7. An electronic device comprising an input screen capable of detecting a location specified by a user, the electronic device comprising:
an inhibition device including
first obtaining means for obtaining, from the controlled device, the location information on the location specified by the user;
first determining means for determining, in accordance with the location information obtained by the first obtaining means, whether or not an operation of the user is an operation for causing the controlled device to execute a predetermined process; and
transmitting means for transmitting the inhibition information in a case where the first determining means determines that the operation of the user is an operation for causing the controlled device to execute the predetermined process; and
a controlled device as set forth in claim 5.

8. A non-transitory computer-readable storage medium containing a program for controlling at least one of
(a) an inhibition device including
first obtaining means for obtaining, from the controlled device, the location information on the location specified by the user;
first determining means for determining, in accordance with the location information obtained by the first obtaining means, whether or not an operation of the user is an operation for causing the controlled device to execute a predetermined process; and
transmitting means for transmitting the inhibition information in a case where the first determining means determines that the operation of the user is an operation for causing the controlled device to execute the predetermined process and
(b) a controlled device as set forth in claim 5 to operate, the program causing a computer to serve as each means included in the inhibition device and/or the controlled device.

9. An inhibition device for transmitting, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being capable of obtaining, from an electronic device that includes an input screen capable of detecting a location specified by a user, location information on the location,
the inhibition device comprising:
first obtaining means for obtaining, from the controlled device, the location information on the location specified by the user;
first determining means for determining, in accordance with the location information obtained by the first obtaining means, whether or not an operation of the user is an operation for causing the controlled device to execute a predetermined process; and transmitting means for transmitting the inhibition information in a case where the first determining means determines that the operation of the user is an operation for causing the controlled device to execute the predetermined process wherein the transmitting means further transmits, to the controlled device, permission information that permits the controlled device to transition from the first state to the second state in a case where, after the transmitting means transmits inhibition information because the first determining means determined that the operation of the user was an operation for causing the controlled device to execute the predetermined process, the first determining means determines, in accordance with location information which has been further obtained by the first obtaining means, that the operation of the user was not an operation for causing the controlled device to execute the predetermined process.

10. An inhibition device as set forth in claim 9, further comprising:

second determining means for determining, in a case where the first determining means determines that an operation of the user is an operation for causing the controlled device to execute the predetermined process, whether or not a predetermined length of time has elapsed since a time at which the first obtaining means obtained the location information, in a case where the second determining means determines that the predetermined length of time has elapsed, the transmitting means transmitting, to the controlled device, permission information that permits the controlled device to transition from the first state to the second state.

11. The inhibition device as set forth in claim 9, wherein the transmitting means transmits the inhibition information during a period between (i) a point in time where the first determining means determines that an operation of the user is an operation for causing the controlled device to execute the predetermined process and (ii) a point in time where the controlled device executes the predetermined process.

12. The inhibition device as set forth in claim 9, wherein the first determining means determines, in a case where the predetermined process is a process for launching an application, that an operation of the user is an operation for causing the controlled device to execute the predetermined process.

13. A controlled device (i) capable of obtaining, from an electronic device that includes an input screen capable of detecting a location specified by a user, location information on the location and (ii) capable of operating in both (but either one at a time) (a) a first state, in which the controlled device executes a process at a predetermined performance level and (b) a second state in which the controlled device executes the process at a performance level lower than the predetermined performance level, the controlled device comprising:
receiving means for receiving inhibition information transmitted from the inhibition device as set forth in claim 9; and
executing means for executing, in the first state, the predetermined process in a case where the receiving means receives the inhibition information.

14. The controlled device as set forth in claim 13, wherein:
the receiving means further receives permission information which has been transmitted from the inhibition device and which permits the controlled device to transition from the first state to the second state; and
in a case where the receiving means receives the permission information, the executing means executes a process either in the first state or in the second state.

15. An electronic device comprising an input screen capable of detecting a location specified by a user, the electronic device comprising:

an inhibition device including
first obtaining means for obtaining, from the controlled device, the location information on the location specified by the user;
first determining means for determining, in accordance with the location information obtained by the first obtaining means, whether or not an operation of the user is an operation for causing the controlled device to execute a predetermined process; and
transmitting means for transmitting the inhibition information in a case where the first determining means determines that the operation of the user is an operation for causing the controlled device to execute the predetermined process; and
a controlled device as set forth in claim 13.

16. A method of controlling an inhibition device for transmitting, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being capable of obtaining, from an electronic device that includes an input screen capable of detecting a location specified by a user, location information on the location, the method comprising:

obtaining, from the controlled device, the location information on the location specified by the user;
determining, in accordance with the information obtained on the location specified by the user, whether or not an operation of the user is an operation for causing the controlled device to execute a predetermined process;
transmitting inhibition information when the information obtained on the location specified by the user determines that the operation of the user is an operation for causing the controlled device to execute the predetermined process;
obtaining, from the controlled device, completion information indicating that the controlled device has ended the predetermined process, and
when obtaining the completion information, further transmitting permission information that permits the controlled device to transition from the first state to the second state.

17. A method for controlling an inhibition device for transmitting, to a controlled device, inhibition information that causes the controlled device to be inhibited from transitioning from a first state, in which the controlled device executes a process at a predetermined performance level, to a second state in which the controlled device executes the process at a performance level lower than the predetermined performance level, the controlled device being capable of obtaining, from an electronic device that includes an input screen capable of detecting a location specified by a user, location information on the location, the method comprising:

obtaining, from the controlled device, the location information on the location specified by the user;

determining, in accordance with the information obtained on the location specific by the user, whether or not an operation of the user is an operation for causing the controlled device to execute a predetermined process; and transmitting inhibition information when the information obtained on the location specified by the user determines that the operation of the user is an operation for causing the controlled device to execute the predetermined process, and further transmitting, to the controlled device, permission information that permits the controlled device to transition from the first state to the second state when, after transmitting inhibition information because the operation of the user was an operation for causing the controlled device to execute the predetermined process, it is determined, in accordance with obtained location information, that the operation of the user was not an operation for causing the controlled device to execute the predetermined process.

* * * * *